United States Patent
Liu et al.

(10) Patent No.: US 9,613,564 B2
(45) Date of Patent: Apr. 4, 2017

(54) IMAGE DISPLAYING METHOD AND IMAGE DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Peng Liu, Beijing (CN); Xue Dong, Beijing (CN); Renwei Guo, Beijing (CN); Kai Yang, Beijing (CN)

(73) Assignees: BOE TECHNOLOGY GROUP CO., LTD., Beijing (CN); BEJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/768,597

(22) PCT Filed: Nov. 12, 2014

(86) PCT No.: PCT/CN2014/090879
§ 371 (c)(1),
(2) Date: Aug. 18, 2015

(87) PCT Pub. No.: WO2016/011728
PCT Pub. Date: Jan. 28, 2016

(65) Prior Publication Data
US 2016/0275856 A1    Sep. 22, 2016

(30) Foreign Application Priority Data

Jul. 23, 2014 (CN) .......................... 2014 1 0351816

(51) Int. Cl.
*G09G 3/3208* (2016.01)
*G09G 3/20* (2006.01)

(52) U.S. Cl.
CPC ............ *G09G 3/3208* (2013.01); *G09G 3/20* (2013.01); *G09G 2300/0443* (2013.01); *G09G 2300/0452* (2013.01); *G09G 2340/0457* (2013.01)

(58) Field of Classification Search
None
See application file for complete search history.

(56) References Cited

U.S. PATENT DOCUMENTS

2008/0180455 A1    7/2008    Ogino et al.

FOREIGN PATENT DOCUMENTS

| CN | 1489127 A | 4/2004 |
|---|---|---|
| CN | 1499477 A | 5/2004 |

(Continued)

OTHER PUBLICATIONS

International Search Report Appln. No. PCT/CN2014/090879; Dated Apr. 22, 2015.

(Continued)

*Primary Examiner* — Michelle Chin
(74) *Attorney, Agent, or Firm* — Ladas & Parry LLP (57) ABSTRACT

The present disclosure relates to an image displaying method and a display apparatus wherein each of raw pixels is divided into a plurality of virtual pixels based on desired image resolution for displaying a frame to be displayed; virtual image information for each of the virtual pixels is determined based on weights of the respective sub-pixels in each of the virtual pixels, weights of the respective sub-pixels in the virtual pixels which are adjacent in rows and the received original image information; thus, each of the virtual pixels displays a color(s) which it lacks itself with the aid of the respective sub-pixels in the virtual pixels which are adjacent in rows, so that the same display function as that of (Continued)

each of the raw pixels may be implemented, and thus the image resolution of the frame to be displayed is increased.

20 Claims, 6 Drawing Sheets

(56) References Cited

FOREIGN PATENT DOCUMENTS

| | | | |
|---|---|---|---|
| CN | 1871630 | A | 11/2006 |
| CN | 102770901 | A | 11/2012 |
| CN | 103886808 | A | 6/2014 |
| CN | 103886809 | A | 6/2014 |
| CN | 103886825 | A | 6/2014 |
| CN | 103903549 | A | 7/2014 |

OTHER PUBLICATIONS

Written Opinion of International Searching Authority Appln. No. PCT/CN2014/090879; Dated Apr. 22, 2015.

IMAGE DISPLAYING METHOD AND IMAGE DISPLAY APPARATUS

TECHNICAL FIELD

The present disclosure relates to an image displaying method and an image display apparatus.

BACKGROUND

Figure 1:
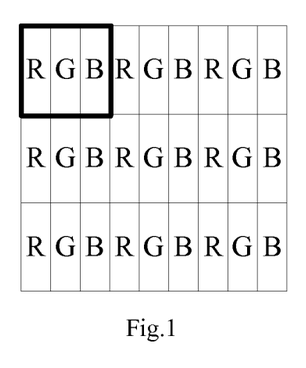
FIG. 1 is a schematic diagram of an arrangement of respective sub-pixels in an existing panel display.

As shown in FIG. 1, in a panel display such as a Light Emitting Diode (LED), an Organic Light Emitting Diode (OLED), a Plasma Display Panel (PDP) and a Liquid Crystal Display (LCD) etc, there are disposed a plurality of sub-pixels having different photoresist colors which are arranged in a matrix. General, three sub-pixels having different photoresist colors constitute one pixel (as indicated by the bold box shown in FIG. 1), wherein, the three photoresist colors are red (R), green (G) and blue (B); or, four or more sub-pixels having different photoresist colors constitute one pixel. When each pixel in the panel display comprises three sub-pixels having different photoresist colors, RGB signals are inputted to the respective sub-pixels in each pixel during a displaying time for one frame, and the panel display will display an image according to a resolution determined by the pixel size.

Currently, as requirements on the resolution at which the panel display displays the image is becoming higher and higher, the resolution at which the panel display displays the image is generally increased by means of reducing the pixel size. However, as the pixel size becomes smaller and smaller, the difficulty in a process for manufacturing the panel display becomes higher and higher. Therefore, the resolution at which the panel display displays the image cannot be further increased only by reducing the pixel size continuously, and there is required a new method for increasing the resolution at which the panel display displays the image.

Therefore, how to increase the resolution at which the panel display displays the image is a technical problem which is needed to be solved by those skilled in the art.

SUMMARY

In view of this, embodiments of the present disclosure provide an image displaying method and an image display apparatus for effectively increasing the resolution at which the panel display displays the image.

Accordingly, an embodiment of the present disclosure provides an image displaying method, comprising:

receiving original image information of a frame to be displayed;

dividing each of raw pixels in a display panel into a plurality of virtual pixels based on a desired image resolution for displaying the frame to be displayed; wherein, each of the virtual pixels comprises part of sub-pixels in each of the raw pixels;

determining virtual image information for each of the virtual pixels when the image of the frame to be displayed is displayed, based on weights of the respective sub-pixels in each of the virtual pixels, weights of the respective sub-pixels for compensation in the virtual pixels which are adjacent in rows and the original image information of the frame to be displayed;

determining displaying image information required by the respective sub-pixels in each of the raw pixels, according to a rule in which a difference between the virtual image information for each of the virtual pixels and the original image information is minimum, based on the determined virtual image information for each of the virtual pixels and the original image information;

performing a displaying based on the determined displaying image information required by the respective sub-pixels in each of the raw pixels and the desired image resolution for displaying.

In the above-mentioned image displaying method according to the embodiment of the present disclosure, each of the raw pixels is divided into the plurality of virtual pixels based on the desired image resolution for displaying the frame to be displayed; the virtual image information for each of the virtual pixels when the image of the frame to be displayed is displayed is determined based on the weights of the respective sub-pixels in each of the virtual pixels, the weights of the respective sub-pixels in the virtual pixels which are adjacent in rows and the received original image information of the frame to be displayed; thus, each of the virtual pixels displays a color(s) which it lacks itself with the respective sub-pixels in the virtual pixels which are adjacent in rows, so that the same display function as that of each raw pixel may be implemented, and thus the image resolution of the frame to be displayed is increased; and the displaying image information required by the respective sub-pixels in each of the raw pixels is determined according to the rule in which the determined difference between the virtual image information and the original image information is minimum; the display is performed based on the determined displaying image information and the desired image resolution for displaying, so the image of the frame to be displayed may be restored better.

In one possible implementation, in the above-mentioned displaying method according to the embodiment of the present disclosure, dividing each of the raw pixels in a display panel into a plurality of virtual pixels based on the desired image resolution for displaying the frame to be displayed specifically comprises:

when the desired image resolution for displaying the frame to be displayed is twice as the original image resolution of the frame to be displayed, in the display panel, six sub-pixels arranged in two rows are divided into four virtual pixels as one repeating group, and wherein constitutions of the respective virtual pixels in one repeating group are different from one another.

In one possible implementation, in the above-mentioned displaying method according to the embodiment of the present disclosure, determining the virtual image information for each of the virtual pixels when the image of the frame to be displayed is being displayed based on the weights of the respective sub-pixels in each of the virtual pixels, the weights of the respective sub-pixels for compensation in the virtual pixels which are adjacent in rows and the original image information of the frame to be displayed specifically comprises:

determining the weights of the respective sub-pixels in each of the virtual pixels and the weights of the respective sub-pixels for compensation in the virtual pixels which are adjacent in rows, based on corresponding areas occupied by the respective sub-pixels in each of the virtual pixels, corresponding areas occupied by the respective sub-pixels for compensation in the virtual pixels which are adjacent in rows, and corresponding distances from the respective sub-pixels for compensation to the virtual pixels being compensated;

determining the virtual image information for each of the virtual pixels when the image of the frame to be displayed is displayed. based on the determined weights of the respective sub-pixels in each of the virtual pixels, the determined weights of the respective sub-pixels for compensation in the virtual pixels which are adjacent in rows and the original image information of the frame to be displayed.

In one possible implementation, in the above-mentioned displaying method according to the embodiment of the present disclosure, determining the displaying image information required by the respective sub-pixels in each of the raw pixels, according to a rule in which the difference between the virtual image information for each of the virtual pixels and the original image information is minimum, based on the determined virtual image information for each of the virtual pixels and the original image information specifically comprises:

determining a mean square error between the virtual image information for each of the virtual pixels and the original image information based on the determined virtual image information for each of the virtual pixels and the original image information;

determining the displaying image information required by the respective sub-pixels in each of the raw pixels when the determined mean square error between the virtual image information for each of the virtual pixels and the original image information is minimum.

In one possible implementation, in the above-mentioned displaying method according to the embodiment of the present disclosure, after determining the displaying image information required by the respective sub-pixels in each of the raw pixels, the method further comprises:

performing a low-pass filtering on the determined displaying image information required by the respective virtual pixels in each of the raw pixels by using a low-pass filter.

Embodiments of the present disclosure further provide an image display apparatus comprising a display panel and a driving apparatus; the driving apparatus comprising:

an information receiving unit for receiving an original image information of a frame to be displayed;

a pixel dividing unit for dividing each of raw pixels in the display panel into a plurality of virtual pixels based on a desired image resolution for displaying the frame to be displayed; wherein, each of the virtual pixels comprises part of the sub-pixels in each of the raw pixels;

a first determination unit for determining the virtual image information for each of the virtual pixels when the image of the frame to be displayed is displayed, based on weights of the respective sub-pixels in each of the virtual pixels, weights of the respective sub-pixels for compensation in the virtual pixels which are adjacent in rows and the original image information of the frame to be displayed;

a second determination unit for determining displaying image information required by the respective sub-pixels in each of the raw pixels, according to a rule in which a difference between the virtual image information for each of the virtual pixels and the original image information is made minimum, based on the determined virtual image information for each of the virtual pixels and the original image information;

an image display unit for performing display based on the determined displaying image information required by the respective sub-pixels in each of the raw pixels and the desired image resolution for displaying.

In the above-mentioned image display apparatus according to the embodiment of the present disclosure, the pixel dividing unit divides each of the raw pixels into a plurality of virtual pixels based on the desired image resolution for displaying a frame to be displayed; the first determination unit determines the virtual image information for each of the virtual pixels when the image of the frame to be displayed is displayed based on the weights of the respective sub-pixels in each of the virtual pixels, the weights of the respective sub-pixels in the virtual pixels which are adjacent in rows and the received original image information of the frame to be displayed; thus, each of the virtual pixels displays the color(s) which it lacks itself with the aid of the respective sub-pixels in the virtual pixels which are adjacent in rows, so that the same display function as that of each of the raw pixels may be implemented, and thus the image resolution of the frame to be displayed is increased; and the second determination unit determines the displaying image information required by the respective sub-pixels in each of the raw pixels according to the rule in which the difference between the determined virtual image information and the original image information is minimum; the image display unit performs the displaying based on the determined displaying image information and the desired image resolution for displaying, so the image of the frame to be displayed may be restored better.

In one possible implementation, in the above-mentioned display apparatus according to the embodiment of the present disclosure, each of the raw pixels in the display panel is composed of a plurality of sub-pixels having different photoresist colors, and of the respective sub-pixels which are adjacent in rows and in columns have different photoresist colors.

In one possible implementation, in the above-mentioned display apparatus according to the embodiment of the present disclosure, the pixel dividing unit is specifically used for dividing six sub-pixels arranged in two rows in the display panel into four virtual pixels as one repeating group when the desired image resolution for displaying the frame to be displayed is twice as the original image resolution of the frame to be displayed, and wherein constitutions of respective virtual pixels in one repeating group are different from each other.

In one possible implementation, in the above-mentioned display apparatus according to the embodiment of the present disclosure, the first determination unit specifically comprises:

a first determination subunit for determining the weights of the respective sub-pixels in each of the virtual pixels and the weights of the respective sub-pixels for compensation in the virtual pixels which are adjacent in rows based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated;

a second determination subunit for determining the virtual image information for each of the virtual pixels when the image of the frame to be displayed is displayed based on the determined weights of the respective sub-pixels in each of the virtual pixels, the determined weights of the respective sub-pixels for compensation in the virtual pixels which are adjacent in rows a and the original image information of the frame to be displayed.

In one possible implementation, in the above-mentioned display apparatus according to the embodiment of the present disclosure, the second determination unit specifically comprises:

a third determination subunit for determining the mean square error between the virtual image information for each of the virtual pixels and the original image information based on the determined virtual image information for each of the virtual pixels and the original image information;

a fourth determination subunit for determining the displaying image information required by the respective sub-pixels in each of the raw pixels when the determined mean square error between the virtual image information for each of the virtual pixels and the original image information is minimum.

In one possible implementation, in the above-mentioned display apparatus according to the embodiment of the present disclosure, the driving apparatus further comprises a low-pass filtering unit for performing low-pass filtering on the determined displaying image information required by the respective virtual pixels in each of the raw pixels by using a low-pass filter.

DETAILED DESCRIPTION

Hereinafter, implementations of an image displaying method and a display apparatus according to embodiments of the present disclosure will be described in detail with reference to the drawings.

Figure 2:
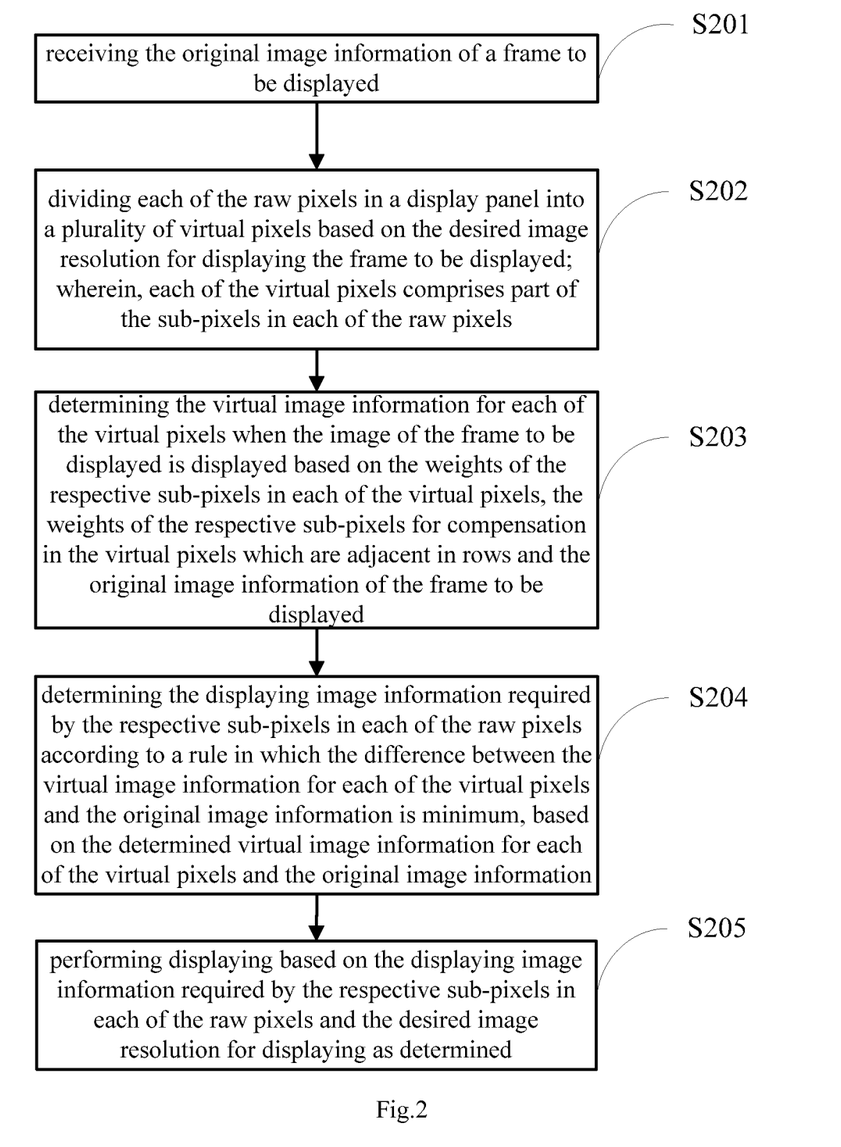
FIG. 2 is a first flow diagram of an image displaying method according to an embodiment of the present disclosure.

As shown in FIG. 2, an image displaying method according to an embodiment of the present disclosure comprises:

S201, receiving original image information of a frame to be displayed;

S202, dividing each of raw pixels in a display panel into a plurality of virtual pixels based on a desired image resolution for displaying the frame to be displayed; wherein, each of the virtual pixels comprises part of the sub-pixels in each of the raw pixels;

S203, determining virtual image information for each of the virtual pixels when the image of the frame to be displayed is displayed, based on weights of the respective sub-pixels in each of the virtual pixels, weights of the respective sub-pixels for compensation in the virtual pixels which are adjacent in rows and original image information of the frame to be displayed;

S204, determining displaying image information required by the respective sub-pixels in each of the raw pixels according to a rule in which a difference between the virtual image information for each of the virtual pixels and the original image information is minimum, based on the determined virtual image information for each of the virtual pixels and the original image information;

S205, performing the displaying based on the determined displaying image information required by the respective sub-pixels in each of the raw pixels and the desired image resolution for displaying.

Since two points will be seen as one point by human eyes when the distance between the two points is small enough with respect to a viewing angle of the human eyes, a plurality of adjacent sub-pixels belonging to different pixels may be regarded as one bright spot by the human eyes. Based on this, in the above-mentioned image displaying method according to the embodiment of the present disclosure, each of the raw pixels is divided into a plurality of virtual pixels based on the desired image resolution for displaying a frame to be displayed; the virtual image information for each of the virtual pixels when the image of the frame to be displayed is displayed is determined based on the weights of the respective sub-pixels in each of the virtual pixels, the weights of the respective sub-pixels in the virtual pixels which are adjacent in rows and the received original image information of the frame to be displayed; thus, each of the virtual pixels displays a color(s) which it lacks itself with the aid of the respective sub-pixels in the virtual pixels which are adjacent in rows, so that the same display function as that of each of the raw pixels may be implemented, and thus the image resolution of the frame to be displayed is increased; and, the displaying image information required by the respective sub-pixels in each of the raw pixels is determined according to the rule in which the difference between the determined virtual image information and the original image information is minimum; then the displaying is performed based on the determined displaying image information and the desired image resolution for displaying, so that the image of the frame to be displayed can be restored better as well.

As implemented in practice, each of the raw pixels in the display panel may comprise three sub-pixels with different photoresist colors, for example, a red (R) sub-pixel, a green (G) sub-pixel and a blue (B) sub-pixel, or, each of the raw pixels in the display panel may also comprise four sub-pixels with different photoresist colors, for example a red (R) sub-pixel, a green (G) sub-pixel, a blue (B) sub-pixel and a white (W) sub-pixel, but there is no limitation on it.

As implemented in practice, in the above-mentioned displaying method according to the embodiment of the present disclosure, the step S202 of dividing each of the raw pixels in a display panel into a plurality of virtual pixels based on the desired image resolution for displaying the frame to be displayed may be implemented as follows in particular: when the desired image resolution for displaying the frame to be displayed is twice as the original image resolution of the frame to be displayed, six sub-pixels arranged in two rows (i.e., two raw pixels) in the display panel are divided into four virtual pixels as one repeating group, wherein constitutions of respective virtual pixels in the one repeating group are different from each other.

Figure 3:
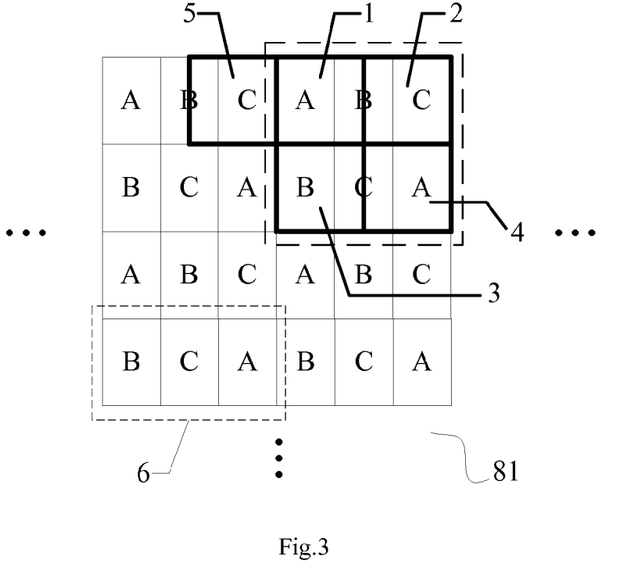
FIG. 3 is a schematic diagram of an arrangement of the respective sub-pixels in the image displaying method according to an embodiment of the present disclosure.

Particularly, as shown in FIG. 3, an explanation will be given by taking a case where each of the raw pixels in the display panel comprises three sub-pixels ABC with the different photoresist colors as an example, wherein FIG. 3 shows sub-pixels of 4 rows*6 columns, i.e., 8 raw pixels. When the desired image resolution for displaying the frame to be displayed is twice as the original image resolution of the frame to be displayed, six sub-pixels arranged in two rows (as indicated by the dashed line box shown in FIG. 3), i.e., two raw pixels in the display panel, are divided into four virtual pixels 1, 2, 3, and 4 as one repeating group, and the constitutions of the respective virtual pixels in the one repeating group are different from each other: a virtual pixel 1 comprises one sub-pixel A and half of a sub-pixel B, a virtual pixel 2 comprises one sub-pixel C and half of a sub-pixel B, a virtual pixel 3 comprises one sub-pixel B and half of a sub-pixel C, and a virtual pixel 4 comprises one sub-pixel A and half of a sub-pixel C.

Of course, the desired image resolution for displaying the frame to be displayed may also be three times as the original image resolution of the frame to be displayed, and at this point, six sub-pixels arranged in two rows (i.e., two raw pixels) in the display panel may be divided into six virtual pixels as one repeating group, i.e., each sub-pixel functions as one virtual pixel, but there is no limitation on it.

As implemented in practice, each of the raw pixels in the display panel may be divided into a plurality of virtual pixels based on the desired image resolution for displaying the frame to be displayed. For example, when the desired image resolution for displaying the frame to be displayed is N times as the original image resolution of the frame to be displayed, each of the raw pixels in the display panel may be divided into N virtual pixels, herein, N is an integer that is greater than or equal to 2. Of course, herein N may also be a positive real number depending on design requirements and actual needs.

It should be noted that, the above-mentioned displaying method according to the embodiment of the present disclosure is applicable to other arrangement patterns of the sub-pixels as well, and is not limited to the arrangement pattern of the sub-pixels as shown in FIG. 3, and there is no limitation on it.

As implemented in practice, in the above-mentioned displaying method according to the embodiment of the present disclosure, the step S203 of determining the virtual image information for each of the virtual pixels when the image of the frame to be displayed is displayed based on weights of the respective sub-pixels in each of the virtual pixels, weights of the respective sub-pixels for compensation in the virtual pixels which are adjacent in rows and the original image information of the frame to be displayed may be implemented by the following steps in particular.

Firstly, the weights of the respective sub-pixels in each of the virtual pixels and the weights of the respective sub-pixels for compensation in the virtual pixels which are adjacent in rows are determined, based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated.

Particularly, as shown in FIG. 3, a virtual pixel adjacent to the virtual pixel 1 on the left is defined as the virtual pixel 5, and an explanation would be given by taking a case where the weights of the respective sub-pixels in the virtual pixel 1 as well as the respective sub-pixels for compensation in the virtual pixel 2 and the virtual pixel 5 which are adjacent in rows are determined as an example. The area occupied by the sub-pixel A in the virtual pixel 1 is 1, the area occupied by the sub-pixel B in the virtual pixel 1 is ½, the areas occupied by the sub-pixel C in the virtual pixel 2 and the virtual pixel 5 are both 1, and the areas occupied by the sub-pixel B in the virtual pixel 2 and the virtual pixel 5 are both ½. Closer a distance from the respective sub-pixel for compensation to the corresponding virtual pixel to be compensated is, greater a distance weight of the respective sub-pixel for compensation is, therefore the distance weights of the sub-pixel A and the sub-pixel B in the virtual pixel 1 are both 1, and given that the distance weights of the sub-pixel B in the virtual pixel 2 and the sub-pixel C in the virtual pixel 5 are both $\alpha$ (½<$\alpha$<1), thus the distance weights of the sub-pixel C in the virtual pixel 2 and the sub-pixel B in the virtual pixel 5 are both 1−$\alpha$. A product of the area occupied by the respective sub-pixel and its distance weight is determined as the weight of the corresponding sub-pixels, therefore, the weights of the sub-pixel A and the sub-pixel B in the virtual pixel 1 are 1 and ½ respectively, the weights of the sub-pixel B and the sub-pixel C in the virtual pixel 2 are $$\frac{\alpha}{2}$$

and 1−$\alpha$ respectively, and the weights of the sub-pixel C and the sub-pixel B in the virtual pixel 5 are $\alpha$ and $$\frac{1-\alpha}{2}$$

respectively.

Then, the virtual image information for each of the virtual pixels when the image of the frame to be displayed is displayed is determined based on the determined weights of the respective sub-pixels in each of the virtual pixels, the determined weights of the respective sub-pixels for compensation in the virtual pixels which are adjacent in rows and the original image information of the frame to be displayed.

Figure 4:
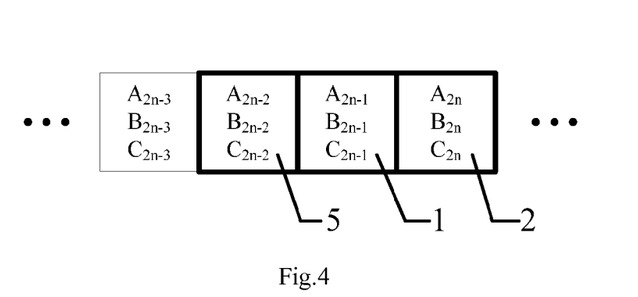
FIG. 4 and FIG. 5 are the respective schematic diagrams in which original image information and virtual image information are inputted to the sub-pixels in the first row in FIG. 3 respectively.
Figure 5:
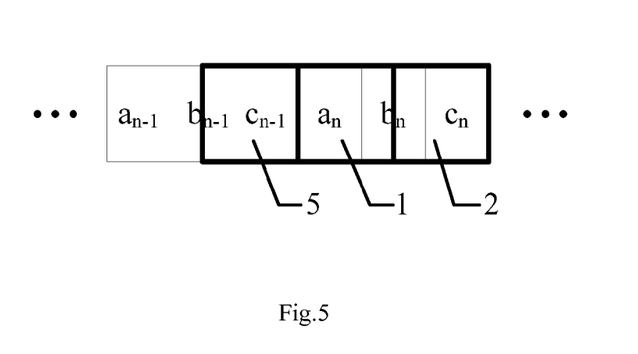

Particularly, for example: as shown in FIG. 4, the original image information of the frame to be displayed received correspondingly by the respective virtual pixels in the row at which the virtual pixel 1 is located are . . . ($A_{2n-3}$, $B_{2n-3}$, $C_{2n-3}$), ($A_{2n-2}$, $B_{2n-2}$, $C_{2n-2}$), ($A_{2n-1}$, $B_{2n-1}$, $C_{2n-1}$), ($A_{2n}$, $B_{2n}$, $C_{2n}$) . . . respectively, and as shown in FIG. 5, the displaying image information required by the respective sub-pixels in the row at which the virtual pixel 1 is located are . . . ($a_{n-1}$,$b_{n-1}$,$c_{n-1}$), ($a_n$,$b_n$,$c_n$), then the virtual image information of the virtual pixel 1 when the image of the frame to be displayed is displayed may be determined as $$\left(a_n, \frac{1-\alpha}{2}b_{n-1} + \frac{1+\alpha}{2}b_n, \alpha c_{n-1} + (1-\alpha)c_n\right)$$

based on the determined weight 1 of $a_n$ to which the sub-pixel A corresponds and the determined weight ½ of $b_n$ to which the sub-pixel B corresponds in the virtual pixel 1, the determined weight $$\frac{\alpha}{2}$$

of $b_n$ to which the sub-pixel B corresponds and the determined weight 1−$\alpha$ of $c_n$ to which the sub-pixel C corresponds in the virtual pixel 2 which is adjacent to the virtual pixel 1, and the determined weight $\alpha$ of $c_{n-1}$ to which the sub-pixel C corresponds and the determined weight $$\frac{1-\alpha}{2}$$

of $b_{n-1}$ to which the sub-pixel B corresponds in the virtual pixel 5 which is adjacent to the virtual pixel 1. Similarly, the virtual image information of the virtual pixel 2 may be determined as $$\left((1-\alpha)a_n + \alpha a_{n+1}, \frac{1+\alpha}{2}b_n + \frac{1-\alpha}{2}b_{n+1}, c_n\right),$$

and the virtual image information of the virtual pixel 5 may be determined as $$\left((1-\alpha)a_{n-1} + \alpha a_n, \frac{1+\alpha}{2}b_{n-1} + \frac{1-\alpha}{2}b_n, c_{n-1}\right).$$

As implemented in practice, in the above-mentioned displaying method according to the embodiment of the present disclosure, the step S204 of determining the displaying image information required by the respective sub-pixels in each of the raw pixels according to a rule in which a difference between the virtual image information for each of the virtual pixels and the original image information is minimum based on the determined virtual image information for each of the virtual pixels and the original image information, may be implemented by the following steps in particular.

Firstly, the mean square error between the virtual image information for each of the virtual pixels and the original image information is determined based on the determined virtual image information for each of the virtual pixels and the original image information.

Particularly, the mean square error between the virtual image information of the respective virtual pixels in the row at which the virtual pixel 1 is located and the original image information of the frame to be displayed received correspondingly may be derived by calculating difference values between the virtual image information and the corresponding original image information, squaring and summing the difference values and then averaging the sum of squares, specifically by the following equation (1):

$$D = \frac{1}{3}\sum_{n=1}^{N} \left\{ \begin{array}{l} [A_{2n-2} - ((1-\alpha)a_{n-1} + \alpha a_n)]^2 + \\ \left[B_{2n-2} - \left(\frac{1+\alpha}{2}b_{n-1} + \frac{1-\alpha}{2}b_n\right)\right]^2 + \\ [C_{2n-2} - c_{n-1}]^2 + [A_{2n-1} - a_n]^2 + \\ \left[B_{2n-1} - \left(\frac{1-\alpha}{2}b_{n-1} + \frac{1+\alpha}{2}b_n\right)\right]^2 + \\ [C_{2n-1} - (\alpha c_{n-1} + (1-\alpha)c_n)]^2 + \\ [A_{2n} - ((1-\alpha)a_n + \alpha a_{n+1})]^2 + \\ \left[B_{2n} - \left(\frac{1+\alpha}{2}b_n + \frac{1-\alpha}{2}b_{n+1}\right)\right]^2 + \\ [C_{2n} - c_n]^2 \end{array} \right\}; \quad \text{equation (1)}$$

wherein, N is the number of the raw pixels in the row at which the virtual pixel 1 is located.

Then, the displaying image information required by the respective sub-pixels in each of raw pixels is determined when the determined mean square error between the virtual image information for each of the virtual pixels and the original image information is minimum. Since the mean square error between the virtual image information for each of the virtual pixels and the original image information reflects a difference between the virtual image information and the original image information, smaller the mean square error is, smaller the difference between the virtual image information and the original image information is and higher a degree of the restoration for the image displayed by the virtual image information is.

In an example, for simplifying the computing process, only the sub-pixel A in the virtual pixel 1 may be taken into account to determine the minimum value of the mean square error between the virtual image information of the respective virtual pixels in the row at which the virtual pixel 1 is located and the original image information of the frame to be displayed received correspondingly in order to calculate the displaying image information $a_n$ required by the sub-pixel A, that is, only the minimum value of the mean square error with respect to the sub-pixel A in the virtual pixel 1 is taken into account. Specifically, the following equation (2) may be obtained by taking a derivative of the mean square error D with respect the component $a_n$ and letting the derivative be zero:

$$\alpha(1-\alpha)a_{n-1} + (2\alpha^2 + 3)a_n + \alpha(1-\alpha)a_{n+1} = \alpha A_{2n-2} + A_{2n-1} + (1-\alpha)A_{2n} \quad \text{equation (2)}.$$

That is, when the displaying image information required by the sub-pixel A in the virtual pixel 1 satisfies the above equation (2), the mean square error between the virtual image information of the respective virtual pixels in the row at which the virtual pixel 1 is located and the original image information is minimum, the difference between the virtual image information of the respective virtual pixels in the row at which the virtual pixel 1 is located and the original image information is minimum, and the degree of the restoration for the virtual image information of the respective virtual pixels in the row at which the virtual pixel 1 is located is the highest.

Given $\alpha_1 = 1 - \alpha$; $\beta_1 = \alpha \alpha_1$; $\gamma_1 = 2\alpha^2 + 3$, the equation (2) may be transformed into a form of matrix:

$$\begin{bmatrix} \gamma_1 & \beta_1 & & & & \\ \beta_1 & \gamma_1 & \beta_1 & & & \\ & \beta_1 & \gamma_1 & \beta_1 & & \\ & & \ddots & & & \\ & & & \ddots & & \\ & & & \beta_1 & \gamma_1 & \beta_1 \\ & & & & \beta_1 & \gamma_1 \end{bmatrix} \begin{bmatrix} a_1 \\ a_2 \\ a_3 \\ \vdots \\ \vdots \\ a_{n-1} \\ a_n \end{bmatrix} = \quad \text{equation (3)}$$

$$\begin{bmatrix} 1 & \alpha_1 & & & & \\ \alpha & 1 & \alpha_1 & & & \\ & \alpha & 1 & \alpha_1 & & \\ & & \ddots & & & \\ & & & \ddots & & \\ & & & \alpha & 1 & \alpha_1 \\ & & & & \alpha & 1 & \alpha_1 \end{bmatrix} \begin{bmatrix} A_1 \\ A_2 \\ A_3 \\ \vdots \\ \vdots \\ A_{2n-1} \\ A_{2n} \end{bmatrix}.$$

Based on equation (3), the displaying image information required by the respective sub-pixels A in the row at which the virtual pixel 1 is located may be derived as follows:

$$\begin{bmatrix} a_1 \\ a_2 \\ a_3 \\ \vdots \\ \vdots \\ a_{n-1} \\ a_n \end{bmatrix} = \begin{bmatrix} \gamma_1 & \beta_1 & & & & & \\ \beta_1 & \gamma_1 & \beta_1 & & & & \\ & \beta_1 & \gamma_1 & \beta_1 & & & \\ & & & \ddots & & & \\ & & & & \ddots & & \\ & & & & \beta_1 & \gamma_1 & \beta_1 \\ & & & & & \beta_1 & \gamma_1 \end{bmatrix} \quad \text{equation (4)}$$

$$\begin{bmatrix} 1 & \alpha_1 & & & & & \\ \alpha & 1 & \alpha_1 & & & & \\ & \alpha & 1 & \alpha_1 & & & \\ & & & \ddots & & & \\ & & & & \ddots & & \\ & & & & \alpha & 1 & \alpha_1 \\ & & & & & \alpha & 1 & \alpha_1 \end{bmatrix} \begin{bmatrix} A_1 \\ A_2 \\ A_3 \\ \vdots \\ \vdots \\ A_{2n-1} \\ A_{2n} \end{bmatrix}.$$

Wherein, a transition matrix may be defined as $$P = \begin{bmatrix} \gamma_1 & \beta_1 & & & & & \\ \beta_1 & \gamma_1 & \beta_1 & & & & \\ & \beta_1 & \gamma_1 & \beta_1 & & & \\ & & & \ddots & & & \\ & & & & \ddots & & \\ & & & & \beta_1 & \gamma_1 & \beta_1 \\ & & & & & \beta_1 & \gamma_1 \end{bmatrix} \quad \text{equation (5)}$$

$$\begin{bmatrix} 1 & \alpha_1 & & & & & \\ \alpha & 1 & \alpha_1 & & & & \\ & \alpha & 1 & \alpha_1 & & & \\ & & & \ddots & & & \\ & & & & \ddots & & \\ & & & & \alpha & 1 & \alpha_1 \\ & & & & & \alpha & 1 & \alpha_1 \end{bmatrix}.$$

Figure 6:
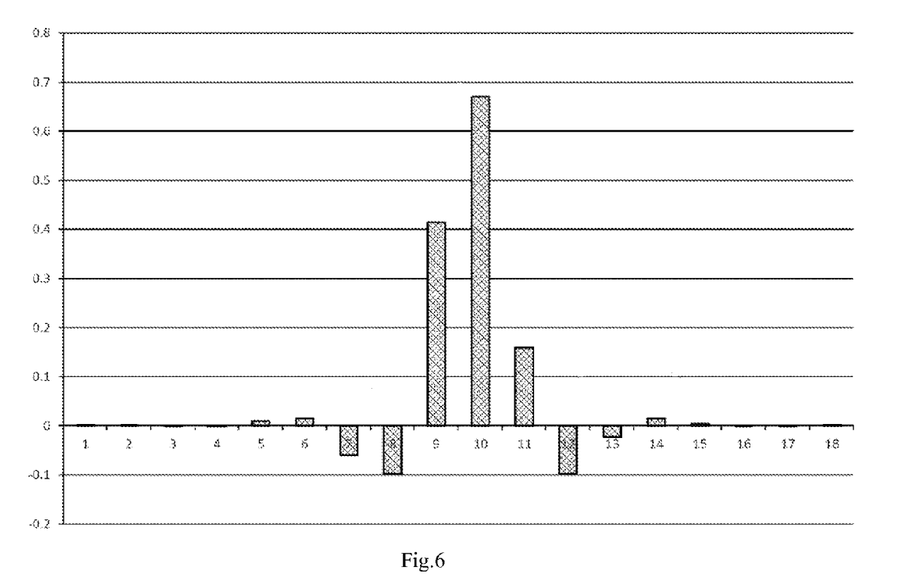
FIG. 6 is an array distribution map in a transition matrix in the image displaying method according to an embodiment of the present disclosure.

To simplify the data processing process and reduce a power consumption of a computing chip, the transition matrix P may be obtained given $\alpha=\frac{2}{3}$. In the transition matrix P, a repeating array centered on a maximum value of 0.6708204 may be found, and an array distribution as shown in FIG. 6 may be obtained by ignoring numeric values close to zero in the repeating array, and the displaying image information $a_n$ required by the sub-pixel A may be derived by taking the repeating array as the weights, i.e.:

$a_n = 0.000304 A_{2n-9} - 0.001288 A_{2n-8} - 0.002083 A_{2n-7} + 0.008825 A_{2n-6} +$ $0.014279 A_{2n-5} - 0.060488 A_{2n-4} - 0.097871 A_{2n-3} + 0.4145898 A_{2n-2} +$ $0.6708204 A_{2n-1} + 0.1583592 A_{2n} - 0.097871 A_{2n+1} - 0.023104 A_{2n+2} +$ $0.014279 A_{2n+3} + 0.0033709 A_{2n+4} - 0.002083 A_{2n+5} - 0.000492 A_{2n+6}.$

Similarly, the minimum value of the mean square error between the virtual image information of the respective virtual pixels in the row at which the virtual pixel 1 is located and the original image information of the frame to be displayed received correspondingly may be determined respectively by only taking into account the sub-pixel B and the sub-pixel C respectively, in order to calculate the displaying image information $b_n$ and $c_n$ required by the sub-pixels B and C respectively. In an example, the displaying image information $b_n$ and $c_n$ required by the respective sub-pixels B and the respective sub-pixels C in the row at which the virtual pixel 1 is located may be obtained by taking the derivative of the mean square error between the virtual image information of the respective virtual pixels in the row at which the virtual pixel 1 is located and the original image information of the frame to be displayed received correspondingly with respect the component $b_n$ and the component $c_n$ in the virtual pixel 1 respectively, and letting the derivatives be zero; the detailed implementations thereof are similar to the embodiment regarding the displaying image information required by the sub-pixel A in the row at which the virtual pixel 1 is located and details will not be repeated here.

Similarly, the method for obtaining the displaying image information required by the respective sub-pixels A, the respective sub-pixels B and the respective sub-pixels C in the row at which the virtual pixel 3 and the virtual pixel 4 are located is similar to the embodiment for obtaining the displaying image information required by the respective sub-pixels A, the respective sub-pixels B and the respective sub-pixels C in the row at which the virtual pixel 1 is located and details will not be repeated here.

And, the virtual pixels 1, 2, 3 and 4 in FIG. 3 are regarded as one repeating group, therefore the method for obtaining the displaying image information required by the respective sub-pixels in remaining odd-numbered rows in the display panel is the same as the method for obtaining the displaying image information required by the respective sub-pixels in the row at which the virtual pixel 1 is located, and the method for obtaining the displaying image information required by the respective sub-pixels in remaining even-numbered rows in the display panel is the same as the method for obtaining the displaying image information required by the respective sub-pixels in the row at which the virtual pixel 3 is located and details will not be repeated here.

Figure 7:
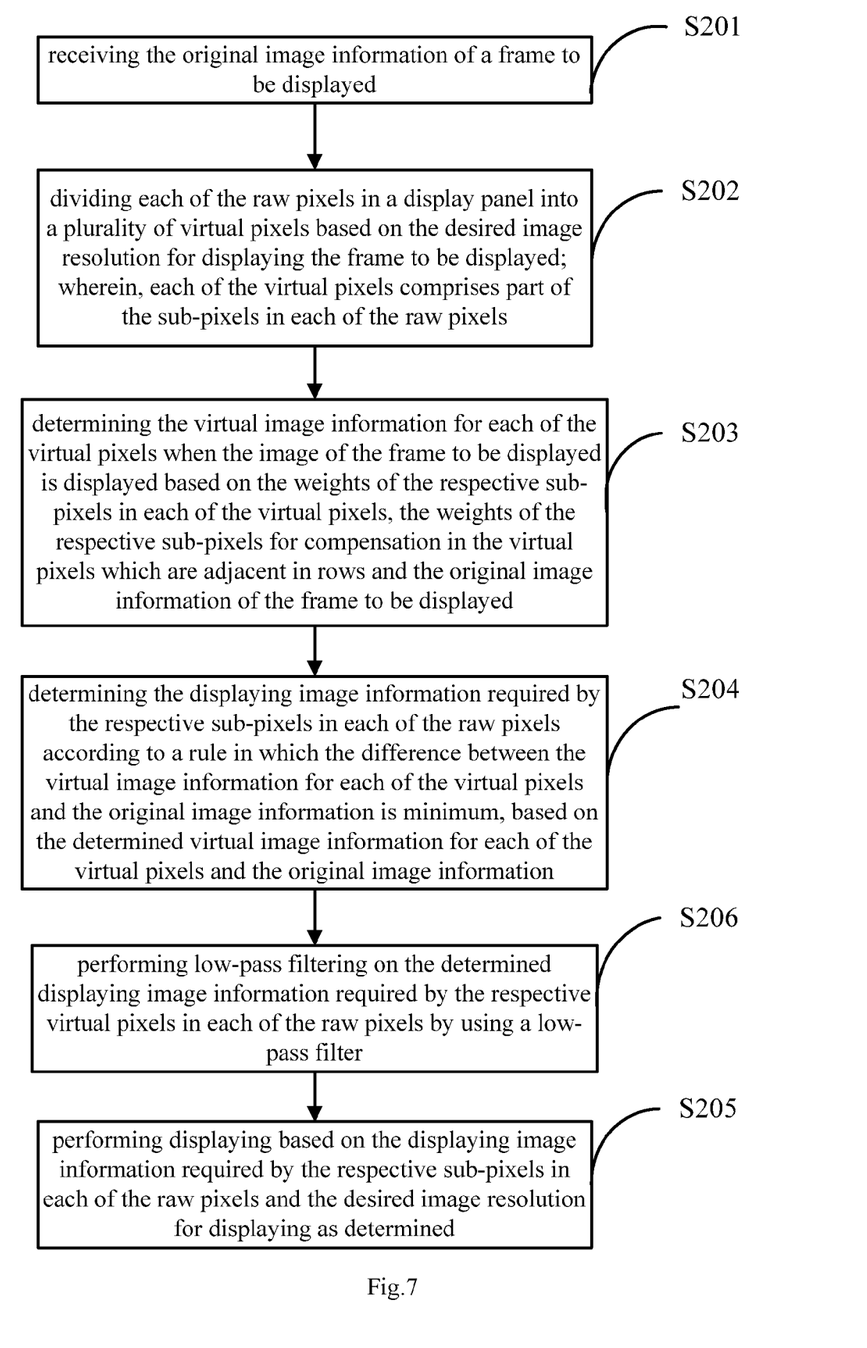
FIG. 7 is a second flow diagram of an image displaying method according to an embodiment of the present disclosure.

As implemented in practice, as shown in FIG. 7, after the step S204 of determining the displaying image information required by the respective sub-pixels in each of the raw pixels in the above-mentioned displaying method according to the embodiment of the present disclosure, the method may further comprise following steps:

S206, performing a low-pass filtering on the determined displaying image information required by the respective sub-pixels in each of the raw pixels by using a low-pass filter.

For example, the determined displaying image information required by the respective sub-pixels in each of the raw pixels in the row at which the virtual pixel 1 is located may be low-pass filtered with a filter $$\left(\frac{1}{9}\frac{2}{9}\frac{3}{9}\frac{2}{9}\frac{1}{9}\right),$$

thus a color aliasing effect in the displaying image information required by the respective sub-pixels in each of the raw pixels in the row at which the virtual pixel 1 is located may be reduced.

Of course, other similar filters may also be used as well to improve a quality for displaying image jointly and there is no limitation on it.

Based on the same inventive concept, the embodiments of the present disclosure further provide an image display apparatus, the principle for the apparatus to address problems is similar to that of the above-mentioned image displaying method, therefore the implementation of the apparatus can be referred to the implementation of the method, and the repetitive parts will be omitted.

Figure 8:
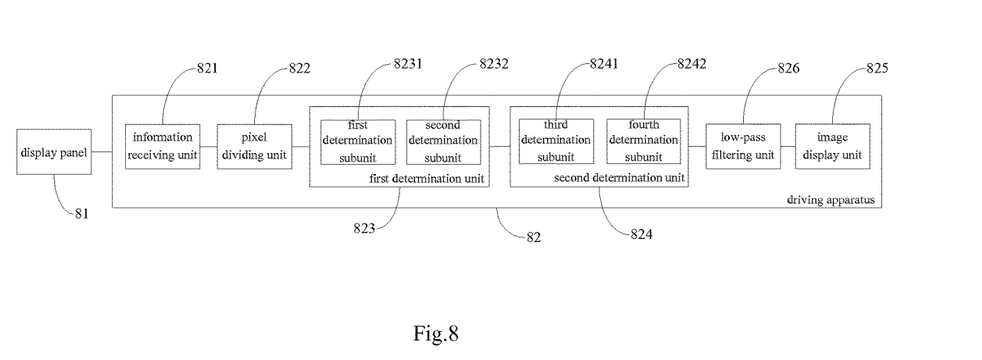
FIG. 8 is a structural representation of an image display apparatus according to an embodiment of the present disclosure.

As shown in FIG. 8, the embodiments of the present disclosure further provide an image display apparatus comprising a display panel 81 and a driving apparatus 82; wherein, the driving apparatus 82 comprises:

an information receiving unit 821 for receiving the original image information of the frame to be displayed;

a pixel dividing unit 822 for dividing each of the raw pixels in the display panel into a plurality of virtual pixels based on the desired image resolution for displaying the frame to be displayed; wherein, each of the virtual pixels comprises part of the sub-pixels in each of the raw pixels;

a first determination unit 823 for determining the virtual image information for each of the virtual pixels when the image of the frame to be displayed is displayed based on the weights of the respective sub-pixels in each of the virtual pixels, the weights of the respective sub-pixels for compensation in the virtual pixels which are adjacent in rows and the original image information of the frame to be displayed;

a second determination unit 824 for determining the displaying image information required by the respective sub-pixels in each of the raw pixels according to the rule in which the difference between the virtual image information for each of the virtual pixels and the original image information is minimum, based on the determined virtual image information for each of the virtual pixels and the original image information; and an image display unit 825 for performing displaying based on the determined displaying image information required by the respective sub-pixels in each of the raw pixels and the desired image resolution for displaying.

Since two points will be seen as one point by human eyes when the distance between the two points is small enough with respect to the viewing angle of the human eyes, a plurality of adjacent sub-pixels belonging to different pixels may be regarded as one bright spot by the human eyes. Based on this, in the above-mentioned image display apparatus according to the embodiment of the present disclosure, the pixel dividing unit divides each of the raw pixels into a plurality of virtual pixels based on the desired image resolution for displaying a frame to be displayed; the first determination unit determines the virtual image information for each of the virtual pixels when the image of the frame to be displayed is displayed based on the weights of the respective sub-pixels in each of the virtual pixels, the weights of the respective sub-pixels in the virtual pixels which are adjacent in rows and the received original image information of the frame to be displayed; thus, each of the virtual pixels displays a color(s) which it lacks itself with the aid of the respective sub-pixels in the virtual pixels which are adjacent in rows, so that the same display function as that of each of the raw pixels may be implemented, and thus the image resolution of the frame to be displayed is increased; and the second determination unit determines the displaying image information required by the respective sub-pixels in each of the raw pixels according to the determined rule in which the difference between the virtual image information and the original image information is minimum; the image display unit performs displaying based on the determined displaying image information and the desired image resolution for displaying, so the image of the frame to be displayed may be restored better as well.

As implemented in practice, in the above-mentioned display apparatus according to the embodiment of the present disclosure, each of the raw pixels in the display panel 81 is composed of a plurality of sub-pixels with having different photoresist colors, and the respective sub-pixels which are adjacent in rows and in columns have different photoresist colors. As shown in FIG. 3, each of the raw pixels 6 is composed of three sub-pixels ABC with different photoresist colors, and these three sub-pixels may be a red (R) sub-pixel, a green (G) sub-pixel and a blue (B) sub-pixel; or, each of the raw pixels 6 may also be composed of four or more sub-pixels with different photoresist colors, and there is no limitation on it.

As implemented in practice, in the above-mentioned display apparatus according to the embodiment of the present disclosure, the pixel dividing unit 822 is specifically used for dividing six sub-pixels arranged in two rows in the display panel into four virtual pixels as one repeating group when the desired image resolution for displaying the frame to be displayed is twice as the original image resolution of the frame to be displayed, and wherein the constitutions of the respective virtual pixels in one repeating group are different from each other. As shown in FIG. 3, when the desired image resolution for displaying the frame to be displayed is twice as the original image resolution of the frame to be displayed, six sub-pixels arranged in two rows (as indicated by the dashed line box shown in FIG. 3), i.e., two raw pixels 6 in the display panel are divided into four virtual pixels 1, 2, 3, and 4 as one repeating group, and wherein the constitutions of the respective virtual pixels in one repeating group are different from each other: the virtual pixel 1 comprises one sub-pixel A and half of a sub-pixel B, the virtual pixel 2 comprises one sub-pixel C and half of a sub-pixel B, the virtual pixel 3 comprises one sub-pixel B and half of a sub-pixel C, and the virtual pixel 4 comprises one sub-pixel A and half of a sub-pixel C.

Of course, the desired image resolution for displaying the frame to be displayed may also be three times as the original image resolution of the frame to be displayed, and at this point, six sub-pixels arranged in two rows i.e., two raw pixels in the display panel are needed to be divided into six virtual pixels as one repeating group, i.e., each sub-pixel functions as one virtual pixel, and there is no limitation on it.

As implemented in practice, each of the raw pixels in the display panel may be divided into a plurality of virtual pixels based on the desired image resolution for displaying a frame to be displayed.

It should be noted that, the above-mentioned display apparatus according to the embodiment of the present disclosure is applicable to other arrangement patterns of the sub-pixels as well, and is not limited to the arrangement pattern of the sub-pixels as shown in FIG. 3, and there is no limitation on it.

As implemented in practice, in the above-mentioned display apparatus according to the embodiment of the present disclosure, the first determination unit 823 may specifically comprise: a first determination subunit 8231 for determining the weights of the respective sub-pixels in each of the virtual pixels and the weights of the respective sub-pixels for compensation in the virtual pixels which are adjacent in rows based on the areas occupied by the respective sub-pixels in each of the virtual pixels, the areas occupied by the respective sub-pixels for compensation in the virtual pixels which are adjacent in rows, and the distances from the respective sub-pixels for compensation to the virtual pixels to be compensated; and a second determination subunit 8232 for determining the virtual image information for each of the virtual pixels when the image of the frame to be displayed is displayed based on the determined weights of the respective sub-pixels in each of the virtual pixels, the determined weights of the respective sub-pixels for compensation in the virtual pixels which are adjacent in rows and the original image information of the frame to be displayed.

As implemented in practice, in the above-mentioned display apparatus according to the embodiment of the present disclosure, the second determination unit 824 may specifically comprise: a third determination subunit 8241 for determining the mean square error between the virtual image information for each of the virtual pixels and the original image information based on the determined virtual image information for each of the virtual pixels and the original image information; and a fourth determination subunit 8242 for determining the displaying image information required by the respective sub-pixels in each of the raw pixels when the determined mean square error between the virtual image information for each of the virtual pixels and the original image information is minimum.

As implemented in practice, in the above-mentioned display apparatus according to the embodiment of the present disclosure, the driving apparatus 82 may further comprise a low-pass filtering unit 826 for performing low-pass filtering on the determined displaying image information required by the respective sub-pixels in each of the raw pixels by using a low-pass filter.

In the image displaying method and a display apparatus according to embodiments of the present disclosure, each of the raw pixels is divided into a plurality of virtual pixels based on the desired image resolution for displaying a frame to be displayed; the virtual image information for each of the virtual pixels when the image of the frame to be displayed is displayed is determined based on the weights of the respective sub-pixels in each of the virtual pixels, the weights of the respective sub-pixels in the virtual pixels which are adjacent in rows and the received original image information of the frame to be displayed; thus, each of the virtual pixels displays a color(s) which it lacks itself with the aid of the respective sub-pixels in the virtual pixels which are adjacent in rows, so that the same display function as that of each of the raw pixels may be implemented, and thus the image resolution of the frame to be displayed is increased; and the displaying image information required by the respective sub-pixels in each of the raw pixels is determined according to the determined rule in which the difference between the virtual image information and the original image information is minimum; display is performed based on the determined displaying image information and the desired image resolution for displaying, so the image of the frame to be displayed may be restored better.

Obviously, those skilled in the art may make various changes and variations on the present disclosure without departing from the spirit and scope of the present disclosure. Thus, the present disclosure intends to cover the changes and variations to the present disclosure if such changes and variations belong to the scope defined by the claims of the present disclosure and equivalence thereof.

This application claims priority to China Patent Application No. 201410351816.9, filed on Jul. 23, 2014, and the content of which in its entirety is herein incorporated by reference as part of the present application.

What is claimed is:

1. An image displaying method, comprising:
   receiving original image information of a frame to be displayed;
   dividing each of raw pixels in a display panel into a plurality of virtual pixels based on a desired image resolution for displaying the frame to be displayed; wherein, each of the virtual pixels comprises part of sub-pixels in each of the raw pixels;
   determining virtual image information for each of the virtual pixels when the image of the frame to be displayed is displayed based on weights of the respective sub-pixels in each of the virtual pixels, weights of the respective sub-pixels for compensation in the virtual pixels which are adjacent in rows and the original image information of the frame to be displayed;
   determining displaying image information required by the respective sub-pixels in each of the raw pixels according to a rule in which a difference between the virtual image information for each of the virtual pixels and the original image information is minimum, based on the determined virtual image information for each of the virtual pixels and the original image information; and
   performing displaying based on the determined displaying image information required by the respective sub-pixels in each of the raw pixels and the desired image resolution for displaying.

2. The method of claim 1, wherein dividing each of the raw pixels in a display panel into a plurality of virtual pixels based on the desired image resolution for displaying the frame to be displayed comprises:
   when the desired image resolution for displaying the frame to be displayed is twice as the original image resolution of the frame to be displayed, dividing six sub-pixels arranged in two rows in the display panel into four virtual pixels as one repeating group, and wherein constitutions of respective virtual pixels in one repeating group are different from each other, or
   when the desired image resolution for displaying the frame to be displayed is three times as the original image resolution of the frame to be displayed, dividing six sub-pixels arranged in two rows in the display panel into six virtual pixels as one repeating group, and wherein the constitutions of respective virtual pixels in one repeating group are different from each other.

3. The method of the claim 2, wherein determining the virtual image information for each of the virtual pixels when the image of the frame to be displayed is displayed based on the weights of the respective sub-pixels in each of the virtual pixels, the weights of the respective sub-pixels for compensation in the virtual pixels which are adjacent in rows and the original image information of the frame to be displayed comprises:
   determining the weights of the respective sub-pixels in each of the virtual pixels and the weights of the respective sub-pixels for compensation in the virtual pixels which are adjacent in rows based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated;
   determining the virtual image information for each of the virtual pixels when the image of the frame to be displayed is displayed based on the determined weights of the respective sub-pixels in each of the virtual pixels, the determined weights of the respective sub-pixels for compensation in the virtual pixels which are adjacent in rows and the original image information of the frame to be displayed.

4. The method of claim 3, wherein determining the displaying image information required by the respective sub-pixels in each of the raw pixels according to a rule in which a difference between the virtual image information for each of the virtual pixels and the original image information is minimum based on the determined virtual image information for each of the virtual pixels and the original image information, comprises:
   determining a mean square error between the virtual image information for each of the virtual pixels and the original image information based on the determined virtual image information for each of the virtual pixels and the original image information; and
   determining the displaying image information required by the respective sub-pixels in each of the raw pixels when the determined mean square error between the virtual image information for each of the virtual pixels and the original image information is minimum.

5. The method of claim 2, wherein determining the displaying image information required by the respective sub-pixels in each of the raw pixels according to a rule in which a difference between the virtual image information for each of the virtual pixels and the original image information is minimum based on the determined virtual image information for each of the virtual pixels and the original image information, comprises:
   determining a mean square error between the virtual image information for each of the virtual pixels and the original image information based on the determined virtual image information for each of the virtual pixels and the original image information; and
   determining the displaying image information required by the respective sub-pixels in each of the raw pixels when the determined mean square error between the virtual image information for each of the virtual pixels and the original image information is minimum.

6. The method of the claim 1, wherein determining the virtual image information for each of the virtual pixels when the image of the frame to be displayed is displayed based on the weights of the respective sub-pixels in each of the virtual pixels, the weights of the respective sub-pixels for compensation in the virtual pixels which are adjacent in rows and the original image information of the frame to be displayed comprises:
   determining the weights of the respective sub-pixels in each of the virtual pixels and the weights of the respective sub-pixels for compensation in the virtual pixels which are adjacent in rows based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated;
   determining the virtual image information for each of the virtual pixels when the image of the frame to be displayed is displayed based on the determined weights of the respective sub-pixels in each of the virtual pixels, the determined weights of the respective sub-pixels for compensation in the virtual pixels which are adjacent in rows and the original image information of the frame to be displayed.

7. The method of claim 6, wherein determining the displaying image information required by the respective sub-pixels in each of the raw pixels according to a rule in which a difference between the virtual image information for each of the virtual pixels and the original image information is minimum based on the determined virtual image information for each of the virtual pixels and the original image information, comprises:
   determining a mean square error between the virtual image information for each of the virtual pixels and the original image information based on the determined virtual image information for each of the virtual pixels and the original image information; and
   determining the displaying image information required by the respective sub-pixels in each of the raw pixels when the determined mean square error between the virtual image information for each of the virtual pixels and the original image information is minimum.

8. The method of claim 1, wherein determining the displaying image information required by the respective sub-pixels in each of the raw pixels according to a rule in which a difference between the virtual image information for each of the virtual pixels and the original image information is minimum based on the determined virtual image information for each of the virtual pixels and the original image information, comprises:
   determining a mean square error between the virtual image information for each of the virtual pixels and the original image information based on the determined virtual image information for each of the virtual pixels and the original image information; and
   determining the displaying image information required by the respective sub-pixels in each of the raw pixels when the determined mean square error between the virtual image information for each of the virtual pixels and the original image information is minimum.

9. The method of claim 1, wherein after determining the displaying image information required by the respective sub-pixels in each of the raw pixels, the method further comprises:
   performing a low-pass filtering on the determined displaying image information required by the respective sub-pixels in each of the raw pixels by using a low-pass filter.

10. An image display apparatus, comprising a display panel and a driving apparatus, wherein the driving apparatus comprises:
   an information receiving circuit configured to receive original image information of a frame to be displayed;
   a pixel dividing circuit configured to divide each of raw pixels in the display panel into a plurality of virtual pixels based on a desired image resolution for displaying the frame to be displayed; wherein, each of the virtual pixels comprises part of sub-pixels in each of the raw pixels;
   a first determination circuit configured to determine virtual image information for each of the virtual pixels when the image of the frame to be displayed is displayed based on weights of the respective sub-pixels in each of the virtual pixels, weights of the respective sub-pixels for compensation in the virtual pixels which are adjacent in rows and the original image information of the frame to be displayed;
   a second determination circuit configured to determine the displaying image information required by the respective sub-pixels in each of the raw pixels according to a rule in which a difference between the virtual image information for each of the virtual pixels and the original image information is minimum, based on the determined virtual image information for each of the virtual pixels and the original image information; and
an image display circuit configured to perform displaying based on the determined displaying image information required by the respective sub-pixels in each of the raw pixels and the desired image resolution for displaying.

11. The display apparatus of claim 10, wherein each of the raw pixels in the display panel is composed of a plurality of sub-pixels with different photoresist colors, and the respective sub-pixels which are adjacent in rows and in columns have different photoresist colors.

12. The display apparatus of claim 11, wherein the pixel dividing circuit is configured to divide six sub-pixels arranged in two rows in the display panel into four virtual pixels as one repeating group when the desired image resolution for displaying the frame to be displayed is twice as the original image resolution of the frame to be displayed, and wherein constitutions of respective virtual pixels in one repeating group are different from each other, or
the pixel dividing circuit is configured to divide six sub-pixels arranged in two rows in the display panel into six virtual pixels as one repeating group when the desired image resolution for displaying the frame to be displayed is three times as the original image resolution of the frame to be displayed, and wherein the constitutions of respective virtual pixels in one repeating group are different from each other.

13. The display apparatus of claim 11, wherein the first determination circuit comprises:
a first determination sub-circuit configured to determine the weights of the respective sub-pixels in each of the virtual pixels and the weights of the respective sub-pixels for compensation in the virtual pixels which are adjacent in rows, based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated; and
a second determination sub-circuit configured to determine the virtual image information for each of the virtual pixels when the image of the frame to be displayed is displayed, based on the determined weights of the respective sub-pixels in each of the virtual pixels, the determined weights of the respective sub-pixels for compensation in the virtual pixels which are adjacent in rows and the original image information of the frame to be displayed.

14. The display apparatus of claim 11, wherein the second determination circuit comprises:
a third determination sub-circuit configured to determine a mean square error between the virtual image information for each of the virtual pixels and the original image information based on the determined virtual image information for each of the virtual pixels and the original image information; and
a fourth determination sub-circuit configured to determine the displaying image information required by the respective sub-pixels in each of the raw pixels when the determined mean square error between the virtual image information for each of the virtual pixels and the original image information is minimum.

15. The display apparatus of claim 10, wherein the pixel dividing circuit is configured to divide six sub-pixels arranged in two rows in the display panel into four virtual pixels as one repeating group when the desired image resolution for displaying the frame to be displayed is twice as the original image resolution of the frame to be displayed, and wherein constitutions of respective virtual pixels in one repeating group are different from each other, or
the pixel dividing circuit is configured to divide six sub-pixels arranged in two rows in the display panel into six virtual pixels as one repeating group when the desired image resolution for displaying the frame to be displayed is three times as the original image resolution of the frame to be displayed, and wherein the constitutions of respective virtual pixels in one repeating group are different from each other.

16. The display apparatus of claim 15, wherein the first determination circuit comprises:
a first determination sub-circuit configured to determine the weights of the respective sub-pixels in each of the virtual pixels and the weights of the respective sub-pixels for compensation in the virtual pixels which are adjacent in rows, based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated; and
a second determination sub-circuit configured to determine the virtual image information for each of the virtual pixels when the image of the frame to be displayed is displayed, based on the determined weights of the respective sub-pixels in each of the virtual pixels, the determined weights of the respective sub-pixels for compensation in the virtual pixels which are adjacent in rows and the original image information of the frame to be displayed.

17. The display apparatus of claim 15, wherein the second determination circuit comprises:
a third determination sub-circuit configured to determine a mean square error between the virtual image information for each of the virtual pixels and the original image information based on the determined virtual image information for each of the virtual pixels and the original image information; and
a fourth determination sub-circuit configured to determine the displaying image information required by the respective sub-pixels in each of the raw pixels when the determined mean square error between the virtual image information for each of the virtual pixels and the original image information is minimum.

18. The display apparatus of claim 10, wherein the first determination circuit comprises:
a first determination sub-circuit configured to determine the weights of the respective sub-pixels in each of the virtual pixels and the weights of the respective sub-pixels for compensation in the virtual pixels which are adjacent in rows, based on areas occupied by the respective sub-pixels in each of the virtual pixels, areas occupied by the respective sub-pixels for compensation in the virtual pixels which are adjacent in rows, and distances from the respective sub-pixels for compensation to the virtual pixels to be compensated; and
a second determination sub-circuit configured to determine the virtual image information for each of the virtual pixels when the image of the frame to be displayed is displayed, based on the determined weights of the respective sub-pixels in each of the virtual pixels, the determined weights of the respective sub-pixels for compensation in the virtual pixels which are adjacent in rows and the original image information of the frame to be displayed.

19. The display apparatus of claim 10, wherein the second determination circuit comprises:
- a third determination sub-circuit configured to determine a mean square error between the virtual image information for each of the virtual pixels and the original image information based on the determined virtual image information for each of the virtual pixels and the original image information; and
- a fourth determination sub-circuit configured to determine the displaying image information required by the respective sub-pixels in each of the raw pixels when the determined mean square error between the virtual image information for each of the virtual pixels and the original image information is minimum.

20. The display apparatus of claim 10, wherein the driving apparatus further comprises a low-pass filtering circuit configured to perform a low-pass filtering on the determined displaying image information required by the respective sub-pixels in each of the raw pixels by using a low-pass filter.

* * * * *